4 Sheets—Sheet 1.

H. A. HARVEY.

Assignor by mesne assignments to the American Screw Company.

MACHINE FOR MAKING THE HEADS OF SCREW BLANKS.

No. 7,574. Reissued March 27, 1877.

Assignee:
American Screw Co.
By Masson Wood
Atty.

Witnesses:
J. H. Forbes
A. Cauldwell

4 Sheets—Sheet 2.

H. A. HARVEY.

Assignor by mesne assignments to the American Screw Company.

MACHINE FOR MAKING THE HEADS OF SCREW BLANKS.

No. 7,574. Reissued March 27, 1877.

Witnesses:
C. M. Jordan
A. B. Cauldwell

Assignee:
American Screw Co.
By [illegible]
Atty

4 Sheets—Sheet 3.

H. A. HARVEY.

Assignor by mesne assignments to the American Screw Company.

MACHINE FOR MAKING THE HEADS OF SCREW BLANKS.

No. 7,574. Reissued March 27, 1877.

Assignee:
American Screw Co.
By [illegible]
Atty.

Witnesses:
[illegible]
A. R. Cauldwell

4 Sheets—Sheet 4.

H. A. HARVEY.

Assignor by mesne assignments to the American Screw Company.

MACHINE FOR MAKING THE HEADS OF SCREW BLANKS.

No. 7,574. Reissued March 27, 1877.

Witnesses:
Chas W. Forbes
A. R. Cauldwell

Assignee:
American Screw Co.
By [illegible]
[illegible]

UNITED STATES PATENT OFFICE.

AMERICAN SCREW COMPANY, OF PROVIDENCE, RHODE ISLAND, ASSIGNEE BY MESNE ASSIGNMENTS, OF HAYWARD A. HARVEY.

IMPROVEMENT IN MACHINES FOR NICKING THE HEADS OF SCREW-BLANKS.

Specification forming part of Letters Patent No. 42,768, dated May 17, 1864; antedated April 26, 1864; reissue No. 7,574, dated March 27, 1877; application filed March 7, 1877.

*To all whom it may concern:*

Be it known, that HAYWARD A. HARVEY, of the city, county, and State of New York, did invent certain Improvements in Machines for Manufacturing Screws, of which the following is a specification:

These improvements relate to that class of screw-machines in which an intermittently rotating and reciprocating sliding carrying-wheel, provided with a series of radially-arranged holders, receives the screw-blanks, and successively transfers and presents them head first to the mechanism which cuts them.

This invention consists, broadly, in the combination of such a carrying-wheel with a saw for cutting the nick in the head of a screw; and the invention further consists in so organizing the machine that the head of each successive blank, while being tightly held in one of the receivers, is fed to the cutting-edge of a stationary revolving saw by a part of the sliding motion of the carrying-wheel, in which the receivers are arranged.

Figure 1:
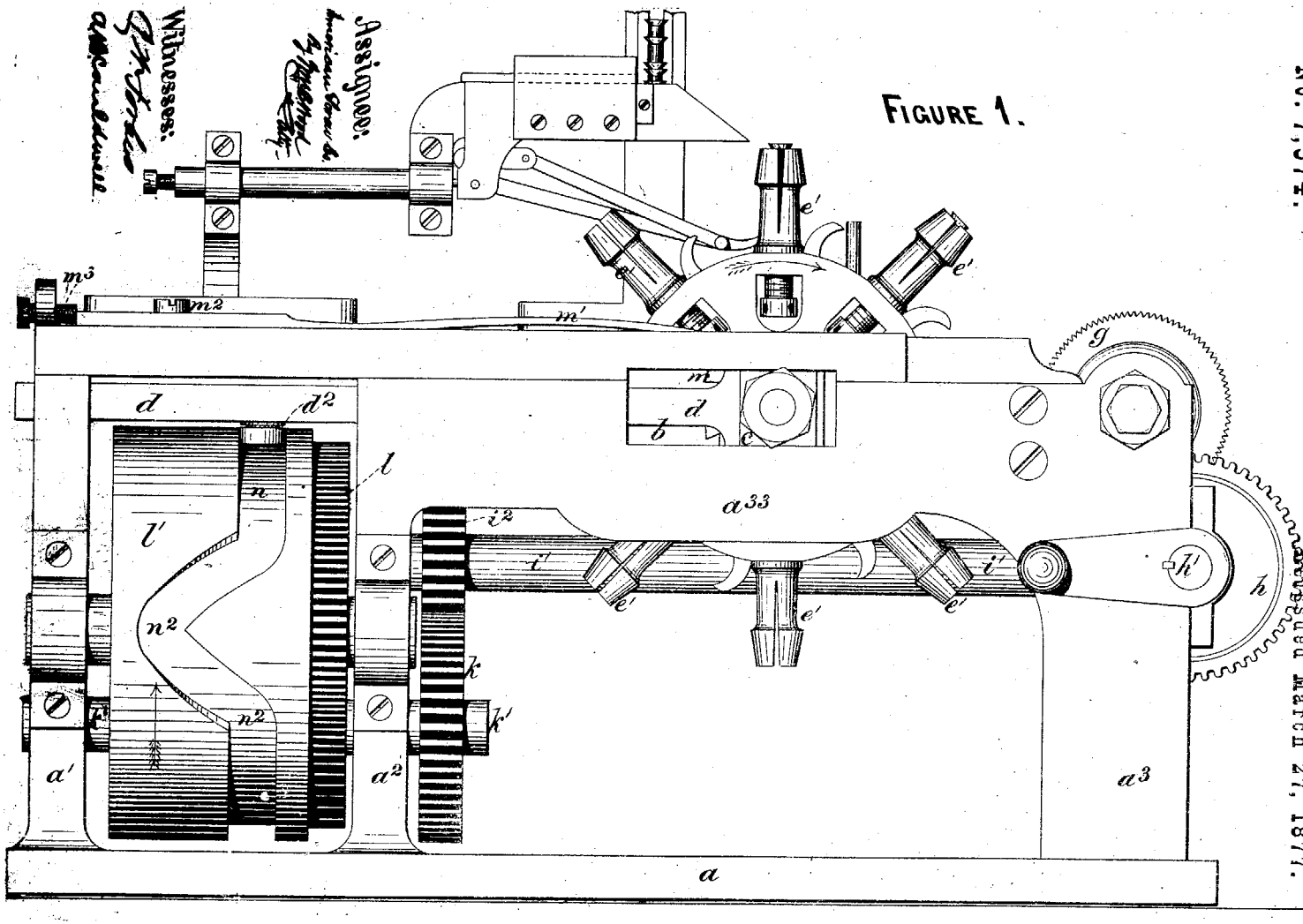
Figure 2:
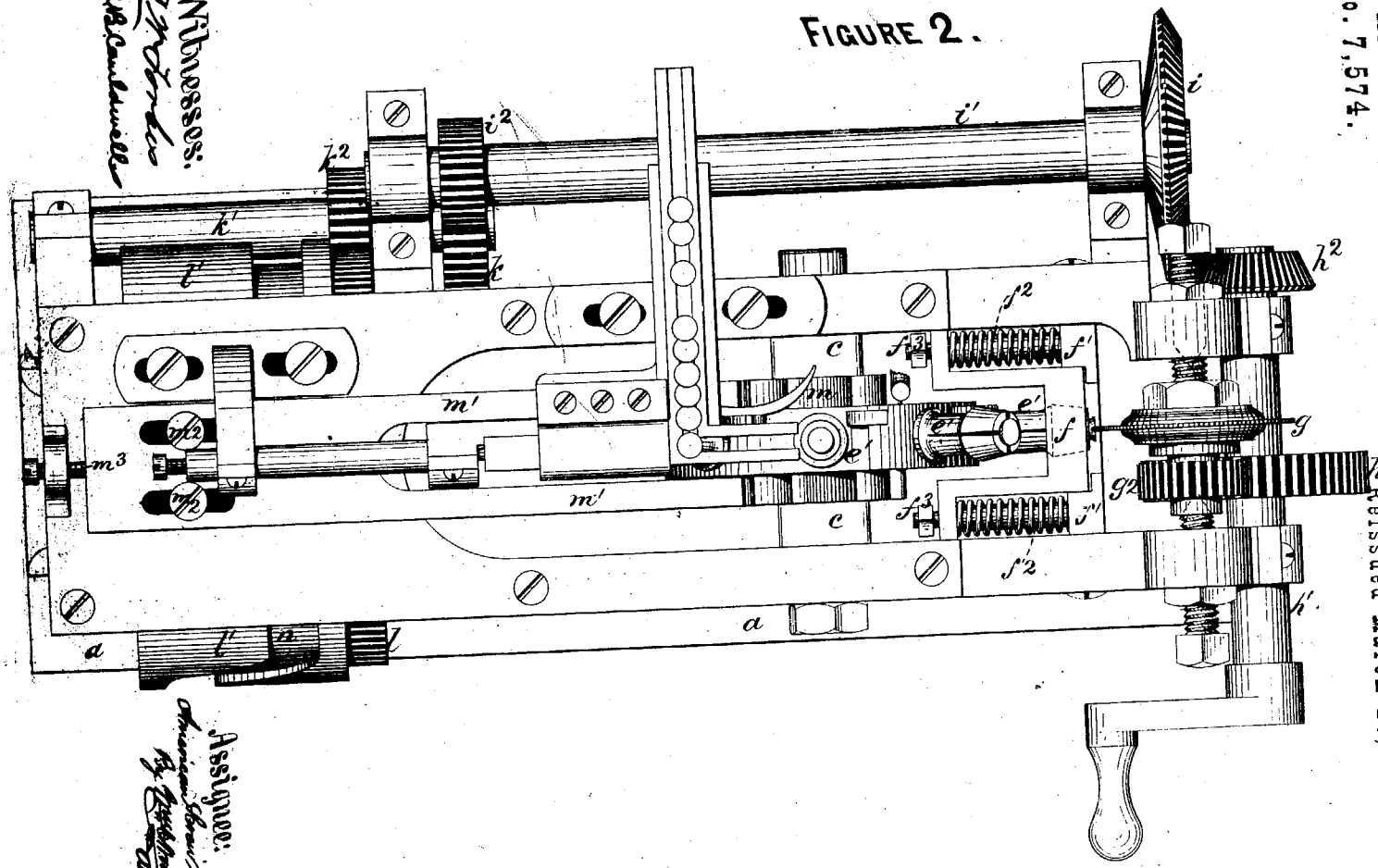
Figure 3:
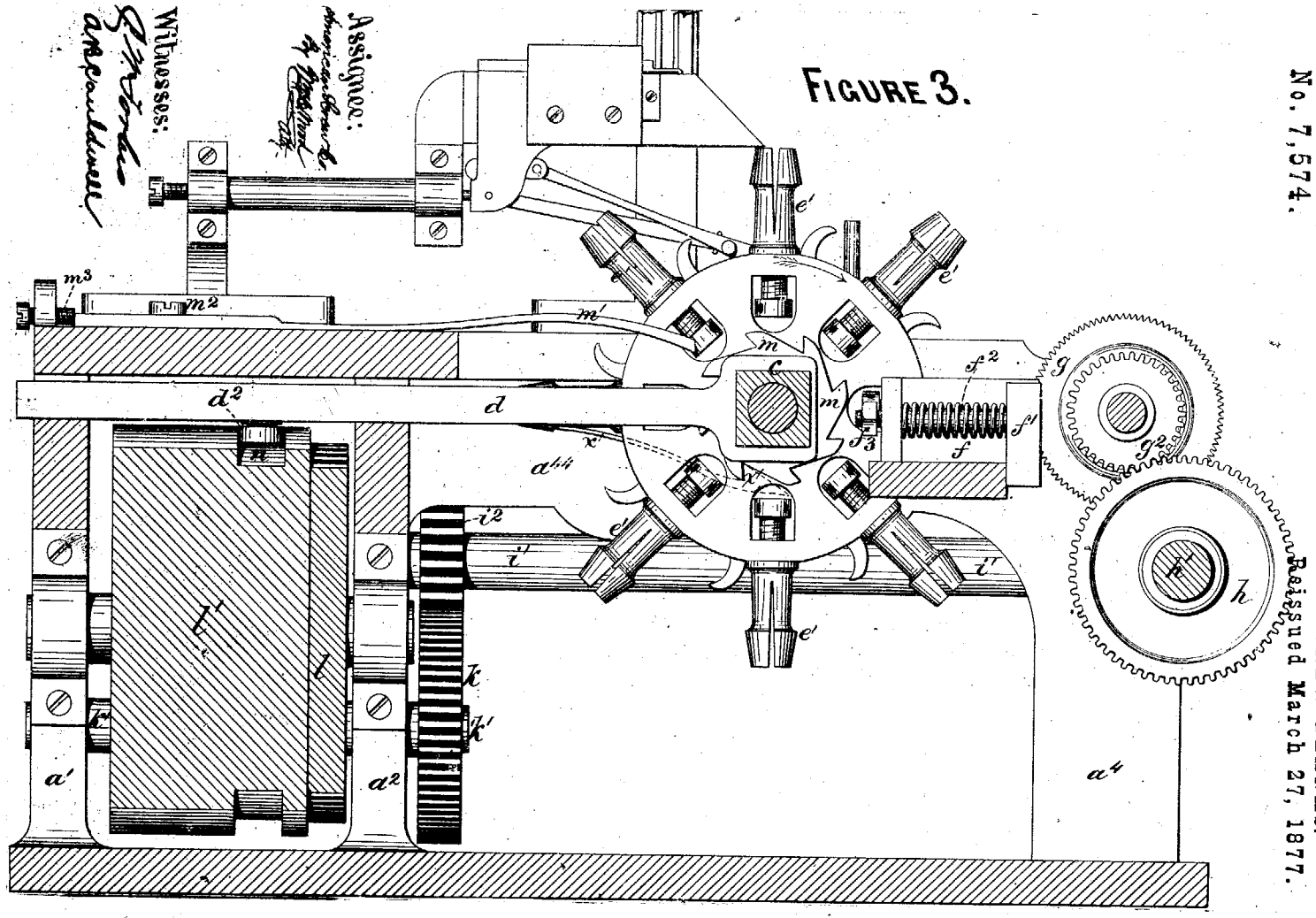
Figure 4:
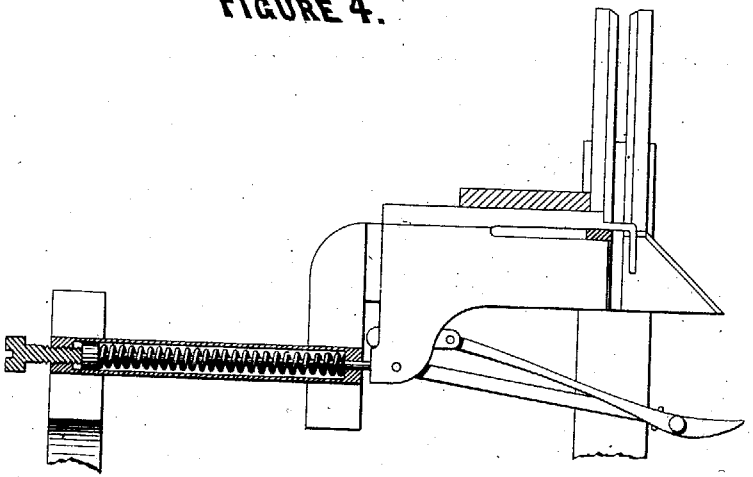

The accompanying drawings are as follows: Figure 1 is a front elevation of the machine. Fig. 2 is a top view. Fig. 3 is a longitudinal vertical section through the line *x x* on Fig. 1. Fig. 4 is a detailed view, partly in elevation, showing the delivering apparatus.

The frame of the machine consists of the bed-plate *a*, two uprights, $a^1$ and $a^2$, standing transversely near the rear end of the machine, and two uprights, $a^3$ and $a^4$, standing longitudinally near the front end of the machine, the latter being respectively connected by the parallel bridges $a^{33}$ and $a^{44}$ with the transverse upright $a^2$. In the parallel bridges are two slots, *b b*, which support and guide the two boxes *c c*, which afford bearings for the shaft of a carrying-wheel, provided with a series of radially-arranged receivers for holding and carrying the screw-blanks. The boxes *c c* are embraced by the ends of a forked slide, *d d*, (see Figs. 1 and 3,) and as this slide moves back and forth it imparts a reciprocating motion in a right line to the boxes *c c*, and hence to the carrying-wheel.

The receivers *e′ e′ e′*, radially arranged upon the carrying-wheel, are tubes—preferably of steel—slit longitudinally, as shown in the drawings. Each receiver may, if desired, have a set-screw in the bottom thereof, as shown, to adjust the depth of the tube to different lengths of blanks. The open outer end of each of these tubes may be countersunk to fit the beveled under side of a screw-head, as shown.

The receivers are exteriorly tapered for a portion of their length, to fit them for entrance into a conical recess or griper, *f*, by the action of which the slit ends of the receiver are convergently compressed upon a blank contained in the receiver.

The griper *f* is a conical socket formed in a U-shaped slide-piece, which rests upon a cross-bar, $f^1$.

The ends of the sides of the U-shaped slide-piece are bent outward at right angles, and perforated to receive the parallel guide-rods $f^2$ $f^2$, which are affixed to the frame, or to the cross-bar $f^1$, and which are surrounded by expanding spiral springs.

These springs tend to force the slide-piece toward the carrying-wheel, but yield to allow the slide-piece to move in the opposite direction, when one of the receivers is forced into the griper *f*. Immediately in front of the griper is the nicking-saw *g*, which is preferably mounted upon adjustable conical bearings.

On the saw-shaft is a cog-wheel, $g^2$, which is driven by the cog-wheel *h*, mounted upon the driving-shaft $h^1$, to which power is applied. The driving-shaft also carries a bevel-wheel, $h^2$, which engages with another bevel-wheel, *i*, mounted upon the shaft $i^1$, extending lengthwise of the machine.

On the opposite end of the shaft $i^1$ is the cog-wheel $i^2$, which engages another wheel, *k*, mounted upon the counter-shaft $k^1$. The counter-shaft also carries the cog-wheel $k^2$, which engages the cog-wheel *l*, affixed to or making part of the revolving-cam $l^1$.

This cam has a grooved track in its periphery, which engages a roller or pin, $d^2$, affixed to the slide *d*.

Upon one or both sides of the carrying-wheel are ratchet-wheels *m m*. The ratchets, when located upon both sides of the carrying-wheel, are acted upon by a forked pawl, $m^1$, secured to the top of the frame by screws $m^2$, passing through slots in the pawl, and by a set-screw, $m^3$, bearing against the end of the pawl, so that it may be properly adjusted.

The drawings represent the position assumed by the various parts of the machine during the nicking of a screw. When the nicking operation has been completed the cam-pin $d^2$ will be engaged by that part of the cam-groove indicated by the letter $n$. As the cam continues its rotation its action upon the cam-pin $d^2$ will cause the slide $d$ to be drawn back, thus moving back the carrying-wheel, and withdrawing the receiver containing the nicked blank from the griper. The griper slide-piece, actuated by the expanding spiral springs on the guide-rods $f^2$ $f^2$, will follow the receiver backward until stopped by the nuts $f^3$ $f^3$ on the ends of the guide-rods.

The continued backward movement of the carrying-wheel brings one of the ratchets $m$ against the end of the pawl $m^1$, thus causing the carrying-wheel, in its further backward movement, to turn until the next receiver in succession is brought into line opposite the griper. At this point the cam-pin $d^2$ is engaged by the apex $n^1$ of the V-shaped part of the cam-groove. The continued rotation of the cam pushes the carriage and the carrying-wheel forward, and forces into the griper the receiver, which has been brought into line with it. The griper, by the action of the springs upon the guide-rods, resists the forward movement of the receiver sufficiently to cause the slit ends of the receiver to be convergently compressed upon the shank of the blank contained in the receiver, and the blank is thus firmly griped. As the cam rotates from $n^2$ to $n$ it forces the receiver in the griper slowly forward, and feeds the head of the blank contained in the receiver against the cutting-edge of the saw, the feeding motion being continued according to the quantity of metal required to be removed by the saw. In order to control the rotation of the carrying-wheel there are provided one or more spring-holding pawls, such as are commonly used for similar purposes.

These pawls act either upon the teeth $m$ or upon other teeth or projections, as shown at $x'$, Fig. 3.

The nicked blanks will fall out of the receivers by their own gravity as the carrying-wheel revolves.

It will be seen that the sliding griper moves forward with the receiver, and that a screw-blank contained in the receiver is firmly griped during the whole of that portion of the forward motion which is devoted to feeding the head to the saw. There is, therefore, no necessity for giving any motion to the saw except a rotating one, and the saw may be mounted in stationary bearings.

It will also be seen that the machine is so organized that a single cam gives motion to all the acting moving parts except the saw.

Screw-blanks may be fed in succession into the receivers by any usual or proper mechanism suitable for the purpose; but it is preferred to use the feeding device shown in the drawings, which is fully described and claimed in the Letters Patent of the United States No. 42,766, issued to Hayward A. Harvey, May 17, 1664, and bearing date the 26th day of April, 1864.

It is to be understood that the shafts, gear, &c., may be variously modified in number and arrangement, and that the carrying-wheel may be rotated and slid by any appropriate machinery, although it is preferred to use a single cam, acting in combination with a slide and stationary pawl.

It is also to be understood that the number of receivers and holders is unimportant, so long as the holders will receive screw-blanks and present the heads of the blanks they contain successively to the nicking-saw.

What is claimed as the invention herein, and desired to be secured by Letters Patent, is—

1. A series of holders capable of receiving and griping screw-blanks, and having both a sliding and a rotating motion, as described, in combination with a sliding griping apparatus, acting substantially as specified.

2. A series of rotating and sliding holders or receivers, substantially such as described, in combination with a sliding griping apparatus and a nicking-saw, substantially as set forth.

3. A carrying-wheel provided with a series of screw-blank receivers, and having an intermittent rotating motion and a reciprocating sliding motion, in combination with a revolving saw for cutting the nick in a screw-head, when the heads of the blanks contained in the receivers are successively fed to the cutting-edge of the saw by a part of the sliding motion of the carrying-wheel in which the receivers are arranged.

AMERICAN SCREW CO.,
By EDWIN G. ANGELL,
*President.*

Witnesses:
GEORGE FULLER,
J. C. B. WOODS.